United States Patent
Fahey et al.

(10) Patent No.: US 6,347,070 B1
(45) Date of Patent: Feb. 12, 2002

(54) PLASTIC CLAMP WITH HUB AND PLATTER FOR USE IN DISC DRIVE

(75) Inventors: James D. Fahey, Farmington; David A. Taylor, Pleasanton; William Drake, Scotts Valley, all of CA (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/655,555

(22) Filed: Sep. 6, 2000

Related U.S. Application Data

(63) Continuation of application No. 09/135,910, filed on Aug. 18, 1998, now Pat. No. 6,205,113.

(51) Int. Cl.[7] .............................. G11B 5/84; G11B 23/03
(52) U.S. Cl. ........................................ 369/290; 360/133
(58) Field of Search ............................ 369/290; 360/133

(56) References Cited

U.S. PATENT DOCUMENTS

| | | | |
|---|---|---|---|
| 4,445,157 A | 4/1984 | Takahashi | 360/133 |
| 4,517,617 A | 5/1985 | Tsuji et al. | 360/133 |
| 4,550,354 A | 10/1985 | Wakabayashi et al. | 360/133 |
| 4,553,175 A | 11/1985 | Baumeister | 358/310 |
| 4,630,728 A | 12/1986 | Matsumoto et al. | 306/133 X |
| 4,652,961 A | 3/1987 | Dieffenbach | 360/133 |
| 4,772,971 A | 9/1988 | Tokuda | 360/99.12 |
| RE32,876 E | 2/1989 | Wakabayashi et al. | 360/133 |
| 4,821,124 A | 4/1989 | Tamaru | 360/133 |
| 5,115,366 A | 5/1992 | Oishi | 360/133 |
| 5,153,801 A | 10/1992 | Ikebe et al. | 360/133 |
| 5,440,436 A | 8/1995 | Iftikar et al. | 360/99.12 |
| 5,444,586 A | 8/1995 | Iftikar et al. | 360/99.12 |
| 5,453,898 A | 9/1995 | Mizuta et al. | 360/133 |
| 5,469,314 A | 11/1995 | Morehouse et al. | 360/105 |
| 5,481,420 A | 1/1996 | Cardona et al. | 360/99.06 |
| 5,512,111 A | 4/1996 | Tahara et al. | 148/440 |
| 5,535,072 A | 7/1996 | Witt et al. | 360/99.06 |
| 5,535,081 A | 7/1996 | Nelson et al. | 360/133 |
| 5,537,281 A | 7/1996 | Ma et al. | 360/133 |
| 5,583,717 A | 12/1996 | Nakata et al. | 360/99.06 |
| 5,724,216 A | 3/1998 | Iftikar et al. | 360/133 |
| 5,757,584 A | 5/1998 | Schick | 360/99.08 |
| 5,793,584 A | 8/1998 | Knight et al. | 360/133 |
| 5,798,888 A | 8/1998 | Fahey et al. | 360/99.08 |
| 6,118,633 A | 9/2000 | Krieger et al. | 360/135 |
| 6,134,081 A | 10/2000 | Muse et al. | 360/133 |
| 6,137,771 A | 10/2000 | McGrath et al. | 369/291 |

FOREIGN PATENT DOCUMENTS

| | | | |
|---|---|---|---|
| EP | 0 747 897 A2 | 12/1996 | |
| JP | 63-86172 | 4/1988 | |
| JP | 0227280 | * 9/1989 | 369/290 |

OTHER PUBLICATIONS

TDB, "Disk release mechanism for magnetic disk cartridge," *IBM Techn. Disclosure Bulletin*, 1979, 2499–2500.
U.S. application No. 08/968,561, Larsen et al., filed Nov. 12, 1997.

* cited by examiner

*Primary Examiner*—Allen Cao
(74) *Attorney, Agent, or Firm*—Woodcock Washburn LLP

(57) ABSTRACT

A disc assembly, a method for producing the disc assembly, and a corresponding disc drive for recording and reading digital information is disclosed. The disc assembly is assembled without using mechanical fasteners and adhesives. The disc assembly includes a platter sandwiched between a plastic clamp and a hub that engages with the clamp. The hub has a hole through which a stake is inserted. The stake is heated to form a rivet-like structure that holds the clamp to the hub. Alternatively, the clamp may be pressed into a receptacle, such as a channel, to hold the clamp to the hub. The clamp may have a circular bevel surface to self align the clamp to the platter as it is affixed to the hub. The corresponding disc drive includes a spindle motor, transducer and actuator. Methods for producing the disc assembly are disclosed.

16 Claims, 4 Drawing Sheets

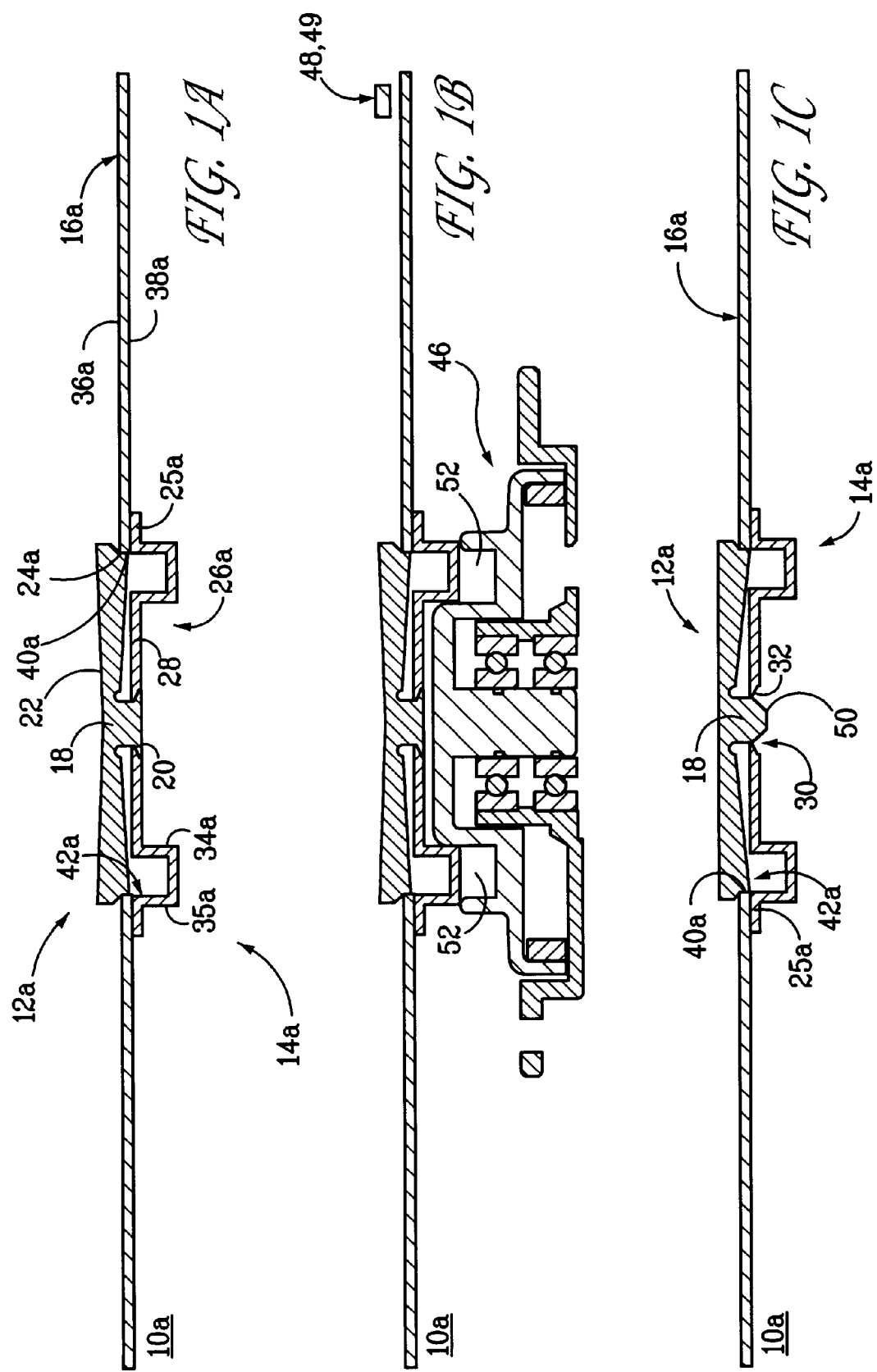

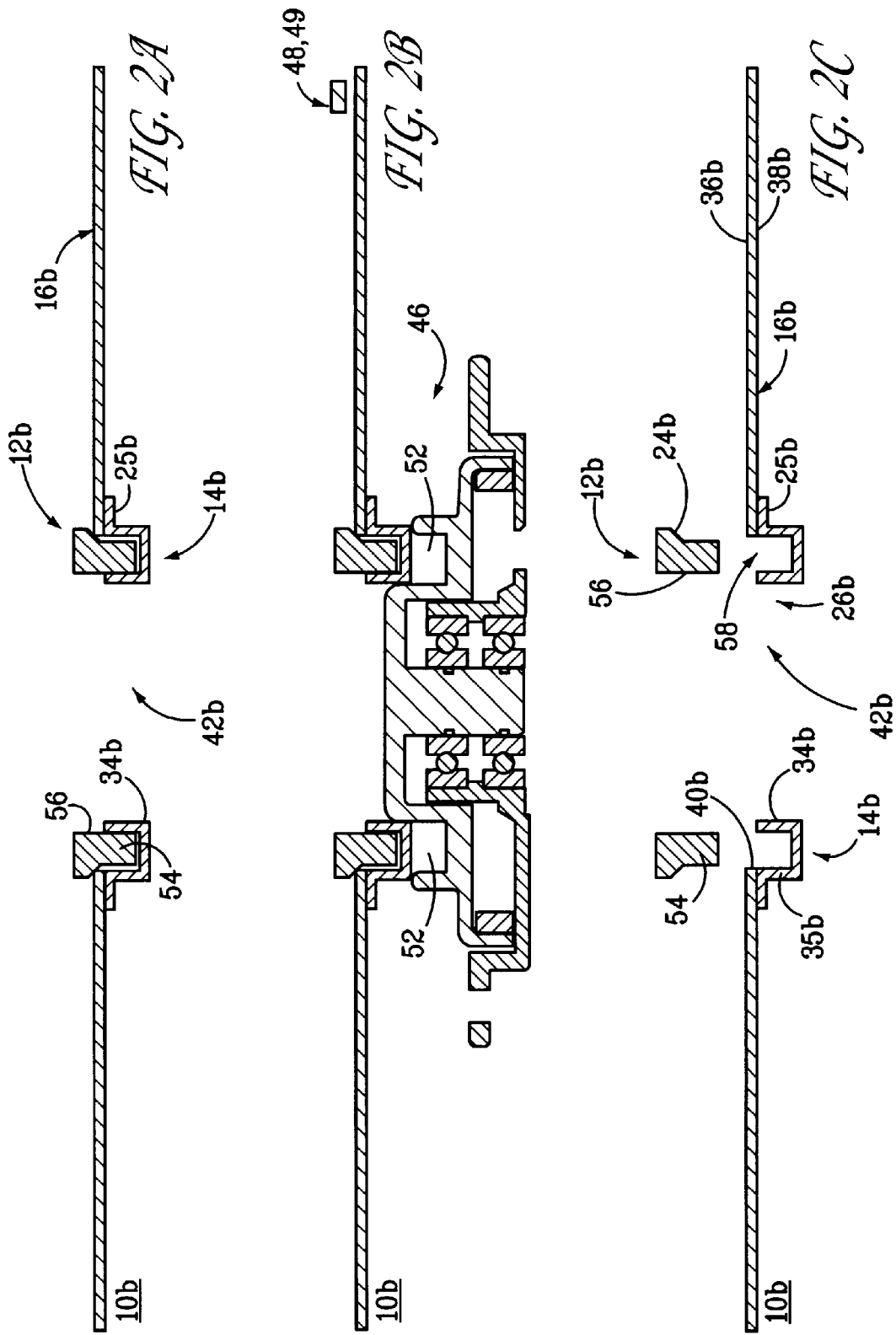

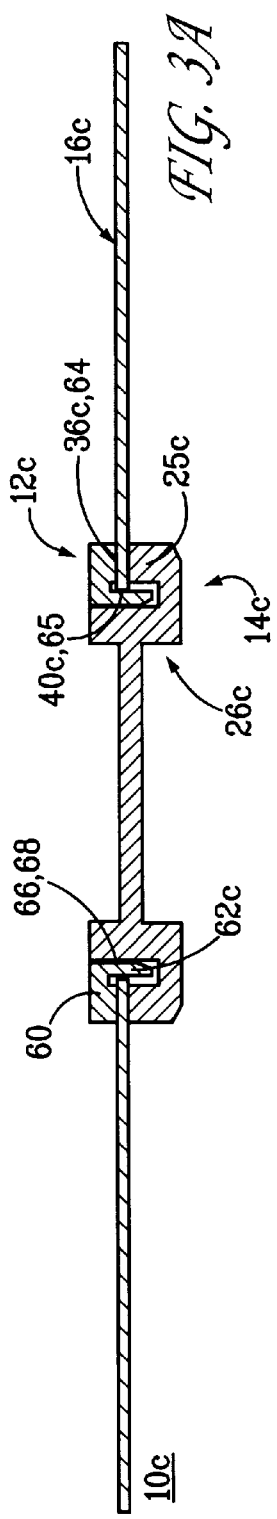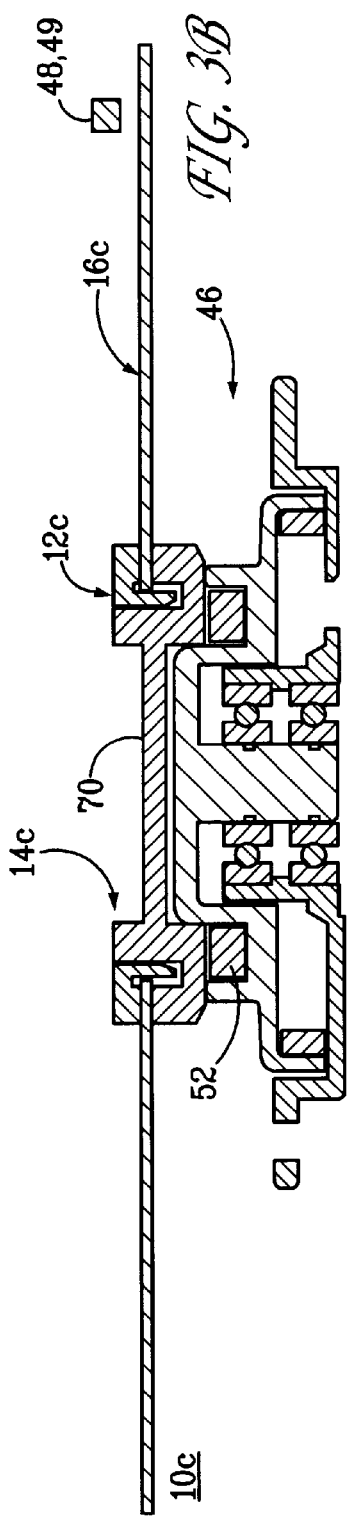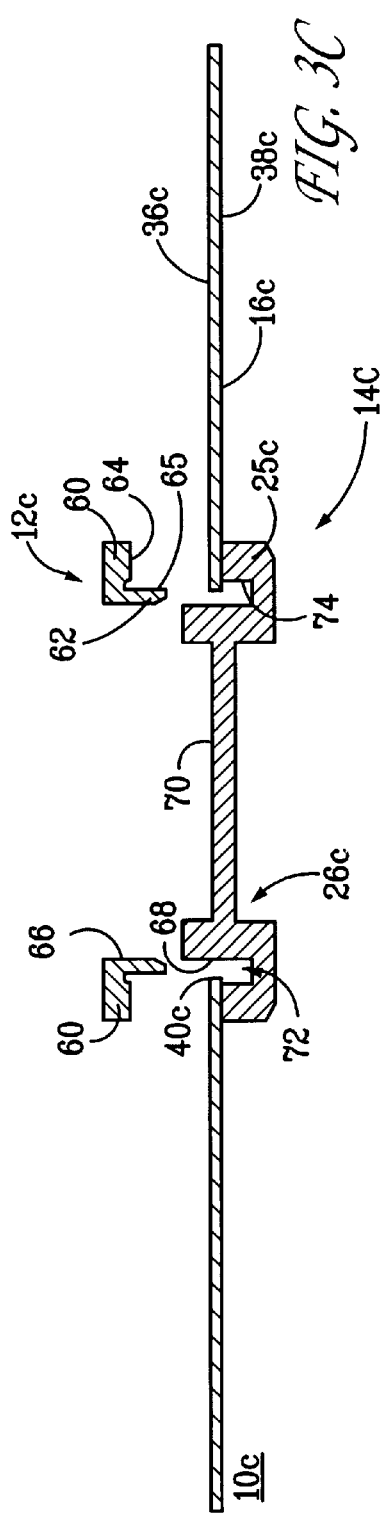

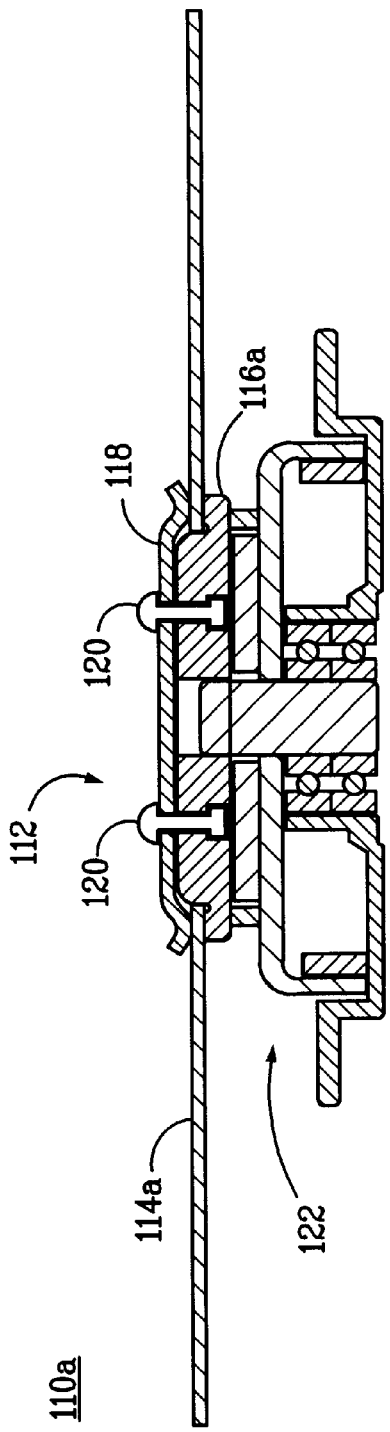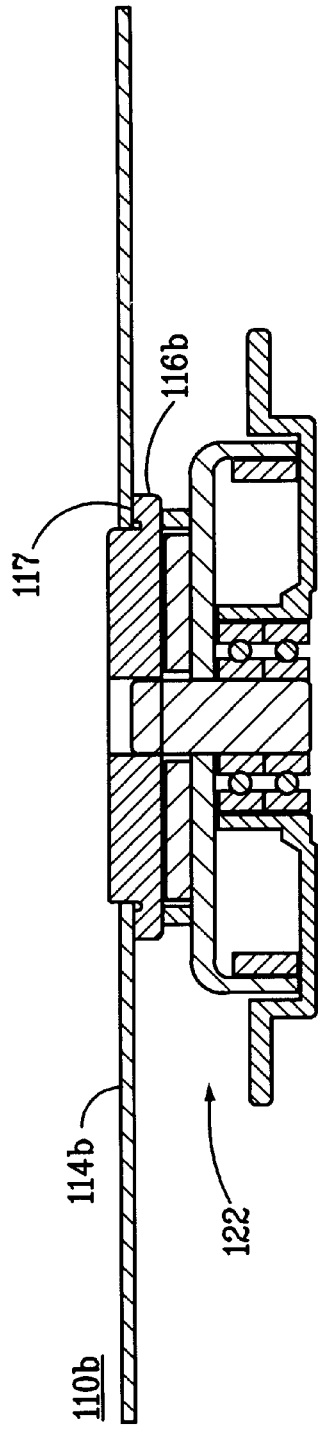

PLASTIC CLAMP WITH HUB AND PLATTER FOR USE IN DISC DRIVE

"This Application is a continuation of Application Serial No. 09/135,910 filed Aug. 18, 1998 -Iom-9561, now U.S. Pat. No. 6,205,113.

FIELD OF THE INVENTION

This invention relates to reading and recording digital information, and more particularly, to disc drive devices.

BACKGROUND

Disc drives that read and record digital information on a disc-shaped information storage medium are in wide-spread use. Such discs include compact discs (CDS), read-only-memory compact discs (CD-ROMs), rigid magnetic discs, and flexible magnetic discs. Rigid magnetic discs include both fixed discs and removable discs that are housed in cartridges. An example of a removable cartridge having a rigid disc assembly is the JAZ™ cartridge and an example of a removable cartridge having a flexible magnetic disc assembly is a ZIP™ cartridge, both of which are produced by the assignee of the present invention, Iomega Corporation, Roy, Utah.

FIG. 4 (prior art) illustrates a conventional rigid disc assembly 110a that includes hub assembly 112 and platter 114a. Hub assembly 112 includes a metallic hub 116a, a clamp 118, and multiple rivets 120. Platter 114a is held between surfaces of the clamp 118 and hub 116, which are held together by rivets 120. Unfortunately, rivets 120 may cause distortion of platter 114a because of dimensional imperfection or dis-uniformity in producing or assembling the components. Even if the components are produced with tight manufacturing and assembly tolerances, platter distortion may still be a problem because of the sensitivity of the reading and recording process to even small amounts of distortion. Specifically, distortion of platter 114a as small as an order of magnitude of $1.0 \times 10^{-6}$ inch may cause interruption of the reading and recording process. The industry trend toward increasing areal density of stored information will likely diminish the acceptable amount of distortion.

Furthermore, platter 114a may slip with respect to hub 116a upon shock to disc assembly 110. Such slip may cause the center of platter 114 to be misaligned with the center of spindle motor 122a, which leads to difficulty in track following by the heads. Although removable cartridges are naturally more prone to shocks that may cause such slip, fixed discs (not shown) may also be subject to such shock, especially during shipping and installation. Moreover, the tight tolerances and several steps required to produce hub assembly 112 result in high cost of discs. Users of information storage discs are sensitive to cost and the industry is cost competitive.

FIG. 5 (prior art) illustrates another conventional disc assembly 110b that includes a platter 114b and a hub 116b. Platter 114b is affixed to a mating surface 117 of hub 116b by an adhesive. Not only does using adhesive have the disadvantages of platter 110a discussed above, but using adhesives causes additional difficulty in the assembly process. For example, adhesives can out-gas and deposit back onto the discs in the drive and cause head stiction and flying height problems. Also imprecise or dis-uniform application of the adhesive may weaken the joint and the adhesive may inadvertently be spilled or splattered onto the information-bearing surface, which may interrupt reading and recording information, and may also damage the heads. The disadvantages of disc assemblies 110a and 110b described herein apply to both rigid and flexible discs, and to fixed and replaceable discs.

It is desirable to provide a disc assembly, and associated disc drive, that diminishes slipping of the platter if subject to shock, that holds the platter uniformly around its inner circumference to eliminate localized distortion near clamp rivets, and that is less costly and more easily produced without extraordinarily tight tolerances of the components.

SUMMARY OF THE INVENTION

Data storage disc assemblies that, among other attributes, are simple to produce, that eliminate or diminish slippage when subjected to shock, that eliminate distortion from fasteners, and that are produced without adhesives are provided. The embodiments of the disc assemblies of the present invention include a clamp having a contact portion and a protruding member, a hub having a receptacle and a center hollow, and a platter having a center aperture. The receptacle receives the protruding portion to affix the clamp to the hub through the center aperture of the platter. Although the platter contains magnetic media, or alternatively optical media, for recording information, the hub and clamp contact portion contact the platter in an area that lacks information storage. The clamp has a feature that enables it to be affixed to the hub without mechanical fasteners and without adhesives, as well as self-aligning features. Furthermore, because the hub and clamp hold the platter substantially uniformly around the perimeter of the center aperture, angular distortion is minimized.

In a first embodiment, a stake on the underside of a clamp is inserted into a void in a hub. The clamp is forced against the hub, depressing a center portion of the clamp, until the stake protrudes through the void. The stake is heated to flatten its head, thereby forming a rivet-like structure that affixes the clamp to the hub. A bevel portion of the clamp aligns the platter with respect to the clamp. This self-aligning feature forces the centers of the clamp, hub, and platter into alignment. Therefore, the platter is joined to the hub, and eventually to a spindle motor, by a simple method that has few steps, and that forms a simple device that has few parts.

Similarly, a second embodiment of the present invention includes a self-aligning bevel feature. A clamp of this embodiment is pressed into an annular channel formed in a hub to form a press fit. In a third embodiment, the clamp is similarly inserted into a hub channel in a press fit. However, rather than a bevel surface, the third embodiment has a flat, horizontal surface to axially contact the platter surface and a flat, vertical surface to radially hold a rim face of the platter's center aperture.

The present invention encompasses methods for forming the disc assemblies described herein without using fasteners or adhesives. Further, the present invention encompasses a disc drive comprising a spindle motor for cooperating with the disc assembly, a transducer for reading and recording digital information on the disc, and an actuator for positioning the transducer. Such a disc drive may include the disc assembly according to the present invention as an integral part of the drive, or the disc drive may be capable of receiving the disc assembly as a part of a removable cartridge.

The disc assemblies and methods according to the present invention securely join the hub, clamp, and platter together without mechanical fasteners and without adhesives. As used in this specification and in the appended claims, the term "mechanical fasteners" broadly includes rivets, pins, screws, bolts and the like; and the term "adhesive" includes any conventional or novel adhesive, flux, glue, grease, sealant and any other substance that possesses adhesive properties.

BRIEF DESCRIPTION OF THE DRAWINGS

FIG. 1A is a view of a first embodiment of a disc assembly according to the present invention;

FIG. 1B is a view of a first embodiment of a disc drive employing the disc assembly of FIG. 1A;

FIG. 1C is a view of the disc assembly of FIG. 1A during its assembly;

FIG. 2A is a view of a second embodiment of a disc assembly according to the present invention;

FIG. 2B is a view of a second embodiment of a disc drive employing the disc assembly of FIG. 2A;

FIG. 2C is a view of the disc assembly of FIG. 2A during its assembly;

FIG. 3A is a view of a third embodiment of a disc assembly according to the present invention;

FIG. 3B is a view of a third embodiment of a disc drive employing the disc assembly of FIG. 3A;

FIG. 3C is a view of the disc assembly of FIG. 3A during its assembly;

FIG. 4 (Prior Art) and FIG. 5 (Prior Art) each are a view of a conventional disc assembly.

DESCRIPTION OF THE PREFERRED EMBODIMENTS

The present invention encompasses an information storage disc assembly, a method of producing the information storage disc assembly, and a corresponding disc drive. The figures illustrate three embodiments of the present invention arranged such that FIGS. 1A, 2A, and 3A show the assembled disc assembly; FIGS. 1B, 2B, and 3B show the disc assembly engaged with a spindle motor, transducer, and actuator to form a disc drive; and FIGS. 1C, 2C, and 3C show the corresponding disc components as they are about to be assembled, which is especially pertinent to the description of the method for producing the corresponding disc assemblies of FIGS. 2A, 2B, and 3A.

Referring specifically to FIG. 1A to illustrate a first embodiment of the present invention, a disc assembly 10a for recording and reading digital information is provided that includes a clamp 12a, a hub 14a, and a platter 16a. Clamp 12a, which preferably is circular, includes a stake 18, a heat-deformed head 20, a depressed center portion 22, and a self aligning contact portion, such as bevel surface 24a. Preferably, heat stake 18 has a tapered tip 50, which is shown in FIG. 1C. Bevel surface 24a may be disposed between two short vertical surfaces for strength and ease of manufacturing, as shown in FIG. 1A.

Hub 14a includes a hub flange 25a, a center hollow 26a, a top plate 28, an inner wall 34a, an outer wall 35a, and a receptacle, such as a void 30, which is shown in FIG. 1C. Void 30 may be formed by a hole through top plate 28, and preferably includes a chamfer surface 32 on the underside of the top plate 28.

Center hollow 26a is preferably integrally formed with hub 14a by inner wall 34a. U.S. patent application Ser. No. 08/835,437, filed Apr. 9, 1997, entitled "A Shutterless Data Recording Cartridge and Drive For Using Same", and U.S. patent application Ser. No. 08/833,781, filed Apr. 9, 1997, entitled "A Disc Hub For a Removable Cartridge and Spindle Motor For Using Same," describe a disc drive and spindle motor, respectively of the type that may be employed by the present invention. Both of these patent applications are assigned to the assignee of the present invention and are incorporated herein by reference in their entirety.

Platter 16a includes a substantially planar top surface 36a, a substantially planar bottom surface 38a, an inner rim surface 40a, and a center aperture 42a. Because the platter is essentially unchanged throughout the embodiments described herein, a description of platter 16b and platter 16c is omitted from description of the corresponding embodiments.

In its assembled state, heat-deformed head 20 fills void 30 to affix clamp 12a to hub 14a. Flange 25a is pressed against bottom surface 38a, and bevel surface 24a is pressed against top surface 36a, because of the compressive force created by the insertion of heat stake 18 and top plate 28, and particularly by heat-deformed head 20 and chamfer surface 32. The manufacturing techniques employed to form heat-deformed head 20 will be understood by those familiar with such manufacturing.

According to another aspect of the present invention, a disc drive that employs disc assembly 10a is provided. Referring to FIG. 1B, a disc drive is shown in an engaged position with center hollow 26a. Clamp magnets 52 anchor hub 14a to spindle motor 46, according to well-known methods. In addition to spindle motor 46, the disc drive according to the present invention includes a conventional transducer 48 that is capable of reading and/or recording digital information stored on surfaces 36a and 38a of platter 16a, and a conventional actuator 49 capable of positioning the transducer 48. It is understood that any conventional transducer 48 and actuator 49 are encompassed by the present invention. Moreover, although FIG. 1B shows the spindle motor of the type described in U.S. patent application Ser. No. 08/833,781, (Attorney Docket No. IOM-9415), it will be clear to those skilled in the art that the present invention may be employed with spindle motors having other geometries. Further, for convenience, a description of transducer 48 and actuator 49 are omitted from the description of subsequent embodiments.

The present invention includes a method for producing a disc assembly 10a. Referring particularly in FIG. 1C, platter 16a is placed onto hub 14a such that bottom surface 38a contacts hub flange 25a. This step will locate a center of void 30 substantially near the center of center aperture 42a, although platter 16a may be placed onto hub 14a without precise tolerances. Clamp 12a is placed opposite hub 14a such that an outer periphery of clamp 12a contacts platter 16a. Heat stake 18 is aligned with void 30. The tapered tip 50 of heat stake 18 is inserted into void 30 of top plate 28 at this stage of assembly. A center portion of clamp 12a is forced toward hub 14a, thereby inserting heat stake 18 through void 30 and clamping platter 16a between clamp 12a and hub 14a. As clamp 12a is forced toward hub 14a, bevel surface 24a is urged against platter 16a. Specifically, bevel surface 24a is urged against the corner formed by rim face 40a and top face 36a.

Throughout this specification and the appended claims, the designation top surface 36a, when used with respect to contacting a bevel surface, will include the corner portion of platter 16a that is formed by rim face 40a and top surface 36a. Because the diameter of clamp 12a is larger at the top of bevel surface 24a than at its bottom, forcing clamp 12a downward causes bevel surface 24a to force platter 16a to a position that is in substantial alignment with the center of clamp 12a. A center portion of clamp 12a is further depressed until depressed center portion 22 is created, as shown in FIG. 1A. When clamp 12a is in its fully inserted position, stake 18 is heated to form heat-deformed head 20. Preferably, heat-deformed head 20 substantially fills void 30. Chamfer portion 32 of top plate 28 thereby forms a rivet with heat-deformed head 20 to anchor clamp 12a to hub 14a.

Referring specifically to FIGS. 2A, 2B and 2C, which illustrate a second embodiment of the invention, a disc assembly 10b for recording and reading digital information is provided that includes a clamp 12b, a hub 14b, and a platter 16b. Clamp 12b has an annular shape, the cross section of which includes a protruding portion 54, a self aligning contact portion, such as bevel surface 24b, and an inner surface 56. Hub 14b includes a hub flange 25b and a receptacle, such as a channel 58 that is formed by inner wall 34b and outer wall 35b. A center hollow 26b is essentially the same as center hollow 26a, therefore the above description of center hollow 26a of the first embodiment applies to disc assembly 10b.

A method for forming disc assembly 10b, which will be described with reference to FIGS. 2A and 2B, is encompassed by the present invention. Platter 16b is positioned on hub 14b such that bottom surface 38b rests on hub flange 25b. Protruding portion 54 is inserted into channel 58. Inner surface 56 of protruding portion 54 preferably has a diameter that is slightly less than the diameter of channel 58—specifically, less than the outer diameter of inner wall 34b—so as to cause clamp 12b to be disposed in channel 58 in a press or interference fit.

The diametral dimensions of inner surface 56 and channel 58 will vary according to the materials used, the thicknesses of the parts, the tolerances with which the components are manufactured, the method of assembly, the desired degree of clamping force, and like variables, as will be understood by those familiar with such mechanical devices. The inner diameter of the inner surface of 56 and the outer diameter of inner wall 34b will preferably be fabricated to produce a light press fit.

Similar to bevel surface 24a of the first embodiment bevel surface 24b self-aligns platter 16b substantially around the center of clamp 12b and hub 14b because the diameter of bevel surface 24b enlarges as clamp 12b is forced farther into channel 58, which forces outward on surface 36b. At its fully-inserted location, clamp 12b tightly holds platter 16b between bevel surface 24b and hub flange 25b, and clamp 12b is tightly held to hub 14b by the press fit therebetween.

Referring specifically to FIG. 2B, according to another aspect of the present invention, a disc drive that employs disc assembly 10b is provided. This disc drive is similar to that described with reference to FIG. 1B, except disc assembly 10b is employed rather than disc assembly 10a.

Referring to FIGS. 3A, 3B, and 3C to illustrate a third embodiment of the present invention, a disc assembly 10c includes clamp 12c, a hub 14c, and a platter 16c. Clamp 12c has a substantially annular shape, the cross section of which forms an "L" shape that includes a flange member 60 and a protruding portion 62. Protruding portion 62 includes an outer contact surface 65 and a self aligning contact portion that is formed by a substantially cylindrical inner contact surface 66 having a tapered end. Flange member 60 has a substantially flat flange surface 64 that is preferably substantially perpendicular to contact surface 66.

Hub 14c includes a hub flange 25c, a center hollow 26c, a center plate 70, and a channel 72 that is formed by a hub outer wall 68 and an interior face 74 of hub flange 25c. Platter 16c includes a top surface 36c, a bottom surface 38c, an inner rim surface 40c, and a center aperture 40c. Center hollow 26c is similar to center hollow 26a,b in that the lower, exterior profile of hub 16c is similar to hub 16a,b. Therefore, the description of center hollow 26a of the first embodiment applies to disc assembly 10c.

When clamp 12c is fully inserted into channel 72 of hub 14c, as shown in FIG. 3A, flange surface 64 of clamp 12c firmly contacts top surface 36c of platter 16c; hub flange 25c firmly contacts bottom surface 38c of platter 16c; and outer contact surface 65 of clamp 12c firmly contacts rim face 40c of platter 16c. Also, inner contact surface 66 of clamp 12c contacts hub outer wall 68 in a press fit. Protruding portion 62 may be in a press or interference fit with both hub outer wall 68 and platter rim face 40c. Thus, platter 16c is firmly axially held between flange surface 64 and hub flange 25c, and firmly radially held by outer contact surface 65.

A method producing disc assembly 10c, which will be described with reference to FIGS. 2A and 2B simultaneously with the description of making and using the present invention, is encompassed by the present invention. Platter 16c is positioned on hub 14c such that bottom surface 38c rests on hub flange 25c. Protruding portion 62 is inserted into channel 72 while platter 16c is disposed between clamp 12c and hub 14c. Because inner contact surface 66 of clamp 12c preferably has a slightly smaller inner diameter than hub outer surface 68, clamp 12c may be forced onto hub 14c when the cylindrical portion of inner contact surface 66 reaches hub outer wall 68. Moreover, as protruding portion 62 is fully inserted into channel 72, outer contact surface 65 contacts rim face 40c of platter 16c.

The diametral dimensions of surface 65, surface 66, and wall 68 will depend on the materials used, the thicknesses of the parts, the tolerances with which the components are manufactured, the method of assembly, the desired degree of clamping force, and like variables, as will be understood by those familiar with such mechanical devices. However, the lack of a bevel feature requires tighter tolerances and less interference between clamp 12c and hub 14c than in the first and second embodiments. Alternatively, materials having greater compressibility may be employed, or hub outer surface 68 and/or inner contact surface 66 may be formed to produce a slight taper or conical shape so as to diminish interference therebetween. In an embodiment having such taper, lower tolerances are helpful to enhance predictability and repeatability with respect to flange surface 64 of clamp 12c, hub flange 25c, and platter surfaces 36c and 38c.

Clamp 12a,b,c may be formed of a poly-carbonate material, although any conventional engineering plastic that possesses a melting point, viscosity, and ductility conducive to forming into heat-deformed stake may be used. Clamp 12b,c are preferably formed of an engineering plastic that possess sufficient mechanical strength and deformation characteristics. Clamp 12a is preferably formed of a thermoplastic. Hubs 14a,b,c are preferably formed of a low carbon steel according to well known manufacturing processes. Regarding hubs 14a, 14b, and 14c, the present invention encompasses hubs both lacking a top plate and having a top plate of various characteristics. A top plate may be beneficial because it may increase the structural strength of the hub.

Although the present invention is illustrated with respect to a disc assembly of the type used in a removable cartridge, the present invention is not limited thereto. Specifically, the disc assemblies 10a,b,c, and the corresponding method for producing them, may also be employed in fixed discs. Furthermore, it is understood that changes may be made to the embodiments described above without departing from the broad inventive concepts thereof. Accordingly, the present invention is not limited to the particular embodiments nor to the theoretical description disclosed, but is intended to cover all modifications that are within the spirit and scope of the invention as defined by the appended claims.

What is claimed is:

1. A disc assembly for reading and recording digital information comprising:
   a platter having a substantially planar bottom surface and a substantially planar top surface, and defining a center aperture;
   a hub, disposed proximate the center aperture, including an inner sidewall and an outer sidewall, said inner sidewall concentric with said outer sidewall to form an annular receptacle therebetween, said hub forming a center hollow for receiving a spindle motor; and
   a clamp, coupled to the platter and opposing said hub, including a contact portion engaged to the platter and a protruding member oriented substantially perpendicular to said contact potion and being disposed at least partially within said receptacle to securely couple the clamp to the hub without mechanical fasteners.

2. The disc assembly of claim 1 wherein the sidewall forms the receptacle and the contact portion includes a self-aligning contact portion.

3. The disc assembly of claim 2 wherein the platter is coupled to said clamp and to said hub without adhesive.

4. The disc assembly of claim 2 wherein said protruding member is formed of a material comprising a plastic.

5. The disc assembly of claim 2 wherein said hub includes a hub flange disposed around said hub and coupled to the bottom surface.

6. The disc assembly of claim 2 wherein said sidewall forms a substantially annular channel that forms at least a portion of said receptacle.

7. The disc assembly of claim 2 wherein said self-aligning contact portion includes a bevel surface the platter.

8. A disc assembly of claim 1 wherein:
   the hub comprises a hub flange coupled to the bottom surface, and a top plate coupled to the hub flange; and
   the receptacle comprises a void formed in the top plate, and the protruding member is at least partially disposed within the void to securely couple the clamp to the hub.

9. A disc assembly for reading and recording digital information comprising:
   a platter having a substantially planar bottom surface and a substantially planar top surface, and defining a center aperture;
   a hub, disposed proximate the center aperture, including a receptacle formed therein and a sidewall forming a center hollow for receiving a spindle motor, said sidewall forming a substantially annular channel that forms at least a portion of said receptacle; and
   a clamp, coupled to the platter and opposing said hub, including a contact portion that engages the platter and a protruding member disposed at least partially within said receptacle to securely couple the clamp to the hub without mechanical fasteners, said protruding member being disposed in said annular channel in a press fit.

10. A disc assembly for reading and recording digital information comprising:
    a platter having a substantially planar bottom surface and a substantially planar top surface, and defining a center aperture;
    a hub, disposed proximate the center aperture, including an inner sidewall and an outer sidewall, said inner sidewall concentric with said outer sidewall to form an annular receptacle therebetween, said hub forming a center hollow for receiving a spindle motor; and
    a clamp, coupled to the platter and opposing said hub, including a contact portion engaged to the platter and a protruding member oriented substantially perpendicular to said contact potion and being disposed at least partially within said receptacle to securely couple the clamp to the hub without mechanical fasteners;
    wherein the sidewall forms the receptacle and the contact portion includes a self-aligning contact portion, wherein said sidewall forms a substantially annular channel that forms at least a portion of said receptacle, and wherein said protruding member has an inner surface and said sidewall has a sidewall inner member, said inner surface and said sidewall inner member coupled together in a press fit.

11. A disc assembly for reading and recording digital information comprising:
    a platter having a substantially planar bottom surface and a substantially planar top surface, and defining a center aperture;
    a hub, disposed proximate the center aperture, including a sidewall that forms a receptacle therein and a center hollow for receiving a spindle motor; and
    a clamp, coupled to the platter and opposing said hub, including a contact portion that engages the platter and a protruding member disposed at least partially within said receptacle to securely couple the clamp to the hub without mechanical fasteners, said protruding member radially abutting the hub;
    wherein said protruding portion includes an outer contact surface that radially contacts the platter and wherein said flange member includes a flange surface that axially contacts the top surface of the platter, said outer contact surface forming at least part of said self-aligning contact portion.

12. The disc assembly of claim 11 wherein said outer contact surface is substantially perpendicular to said flange surface.

13. A disc assembly for reading and recording digital information comprising:
    a platter having a substantially planar bottom surface and a substantially planar top surface, and defining a center aperture;
    a hub, disposed proximate the center aperture, including an inner sidewall and an outer sidewall, said inner sidewall concentric with said outer sidewall to form an annular receptacle therebetween, said hub forming a center hollow for receiving a spindle motor, the hub comprising a hub flange coupled to the bottom surface and a top plate coupled to the hub flange; and
    a clamp, coupled to the platter and opposing said hub, including a contact portion engaged to the platter and a protruding member oriented substantially perpendicular to said contact potion and being disposed at least partially within said receptacle to securely couple the clamp to the hub without mechanical fasteners;
    the receptacle comprising a void formed in the top plate, and the protruding member is at least partially disposed within the void to securely couple the clamp to the hub;
    wherein said protruding member comprises a heat-deformed stake.

14. The disc assembly of claim 13 wherein the platter is coupled to said clamp and to said hub without adhesive.

15. The disc assembly of claim 13 wherein said top plate includes a chamfer surface, disposed opposite said clamp, substantially surrounding said void.

16. The disc assembly of claim 13 wherein said clamp includes a bevel surface contacting the platter.

* * * * *